July 12, 1966  J. F. BABBITT ETAL  3,260,037
INDEFINITE LENGTH FILTER MEANS WITH PROGRAMMING MEANS
Filed Jan. 23, 1963  9 Sheets-Sheet 1

INVENTORS
JOHN F. BABBITT
OSCAR A. WURTENBERG

BY  W. E. Sherwood
ATTORNEY

July 12, 1966  J. F. BABBITT ETAL  3,260,037
INDEFINITE LENGTH FILTER MEANS WITH PROGRAMMING MEANS
Filed Jan. 23, 1963 9 Sheets-Sheet 2

INVENTORS
JOHN F. BABBITT
OSCAR A. WURTENBERG

BY W. E. Sherwood
ATTORNEY

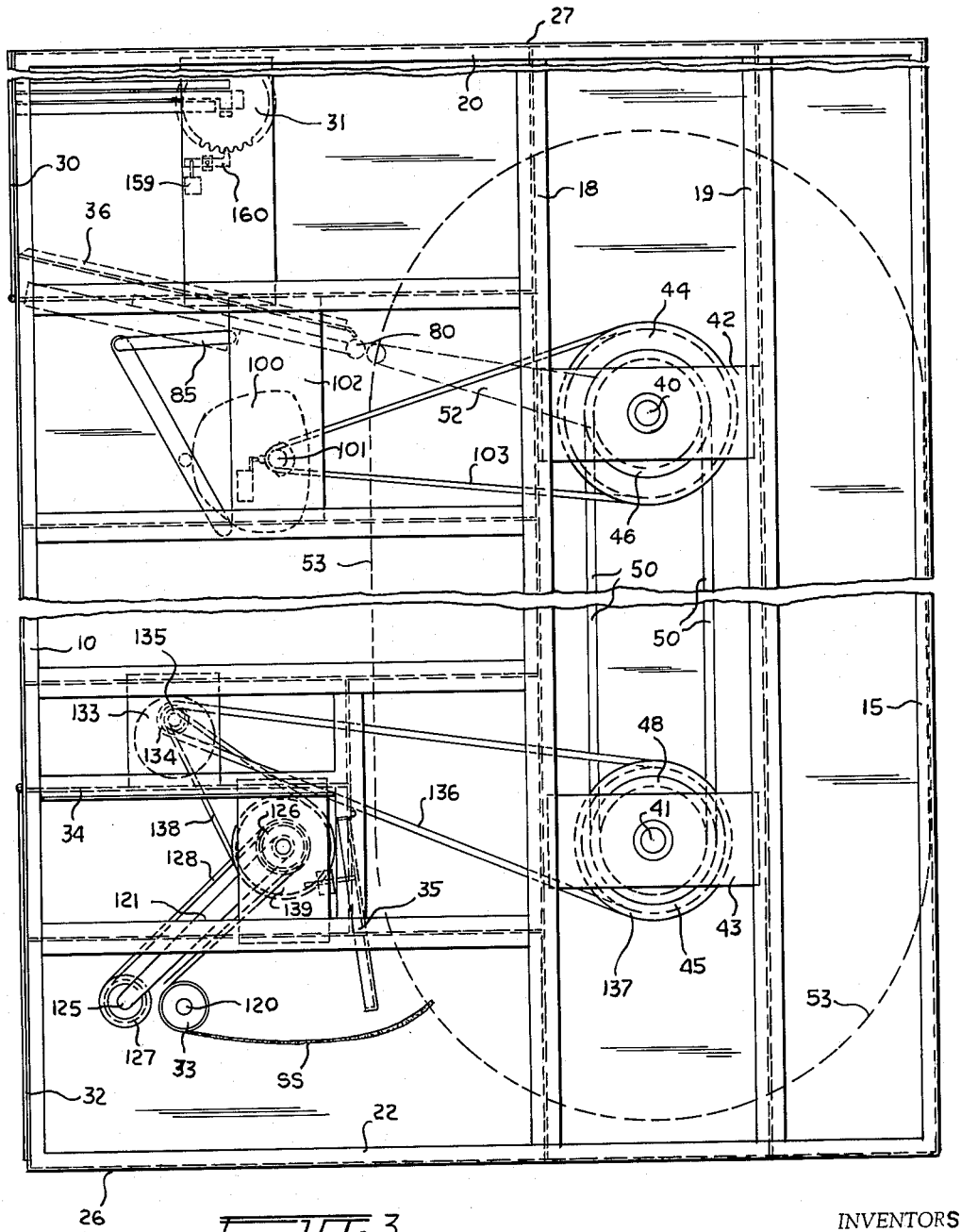

July 12, 1966    J. F. BABBITT ETAL    3,260,037
INDEFINITE LENGTH FILTER MEANS WITH PROGRAMMING MEANS
Filed Jan. 23, 1963    9 Sheets-Sheet 4
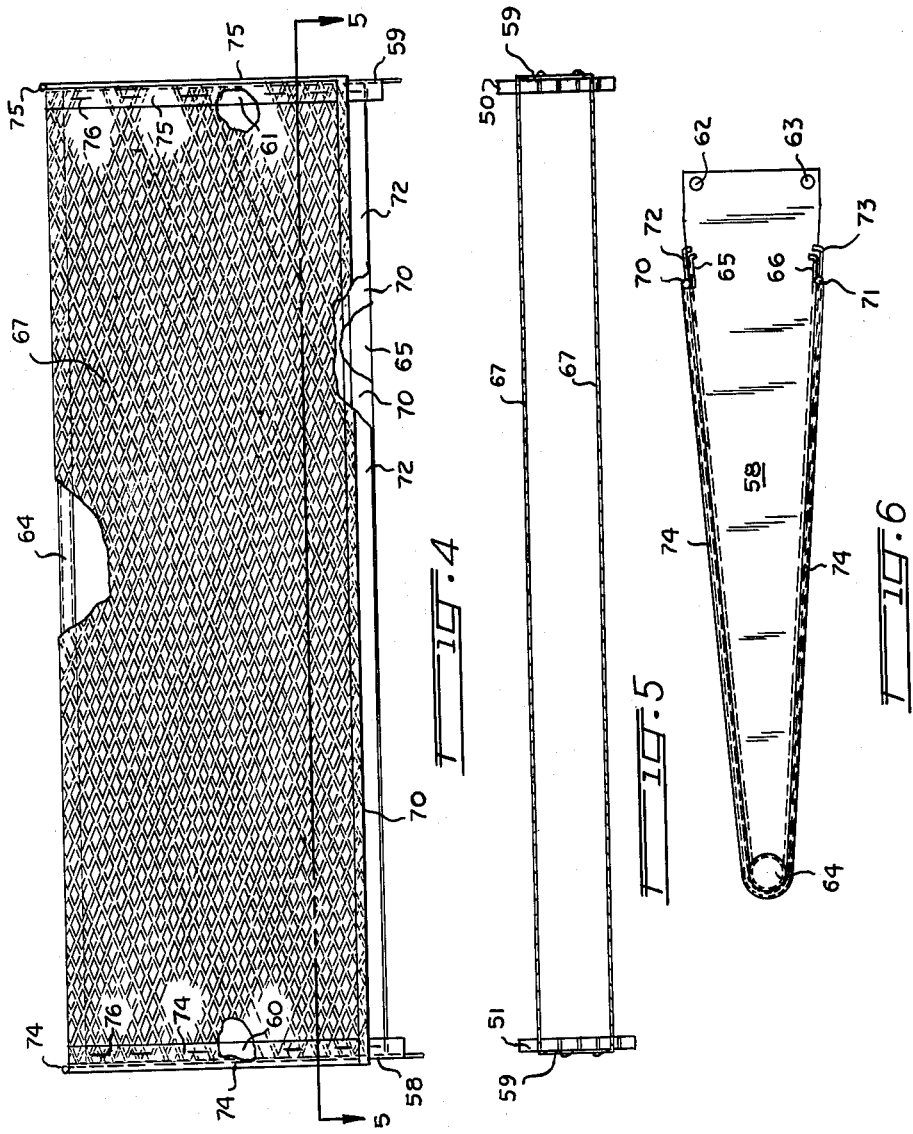
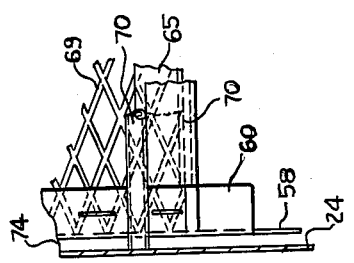
INVENTORS
JOHN F. BABBITT
OSCAR A. WURTENBERG
BY  W. E. Sherwood
ATTORNEY

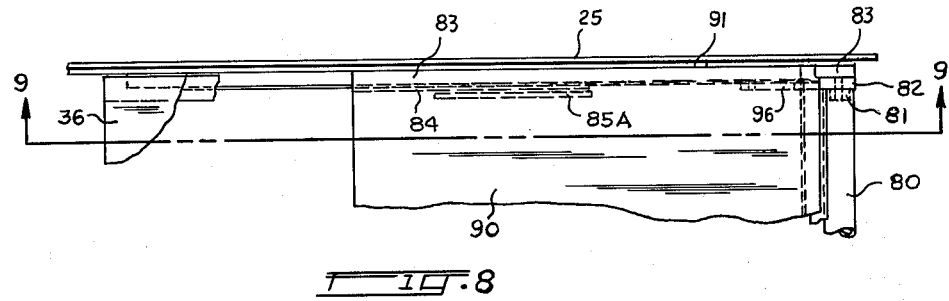
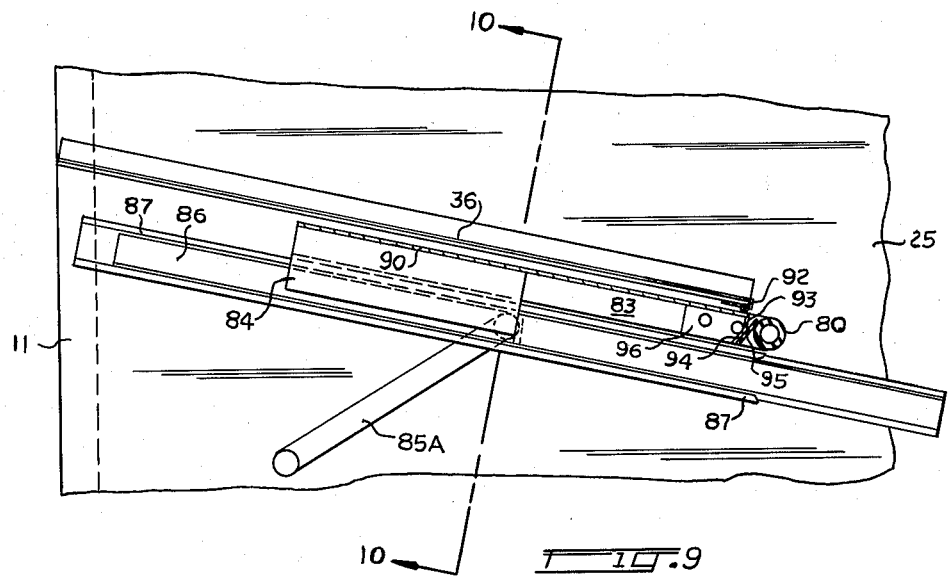
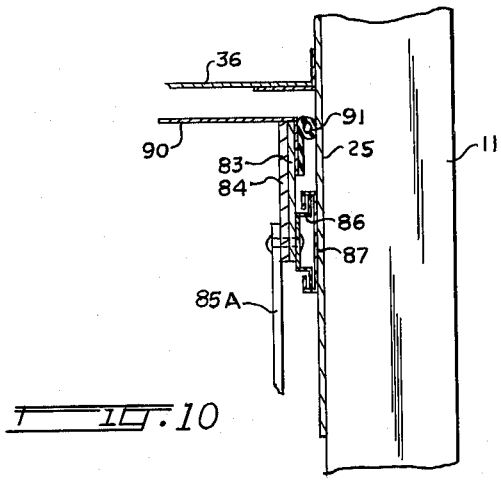
INVENTORS
JOHN F. BABBITT
OSCAR A. WURTENBERG
BY W. E. Sherwood
ATTORNEY

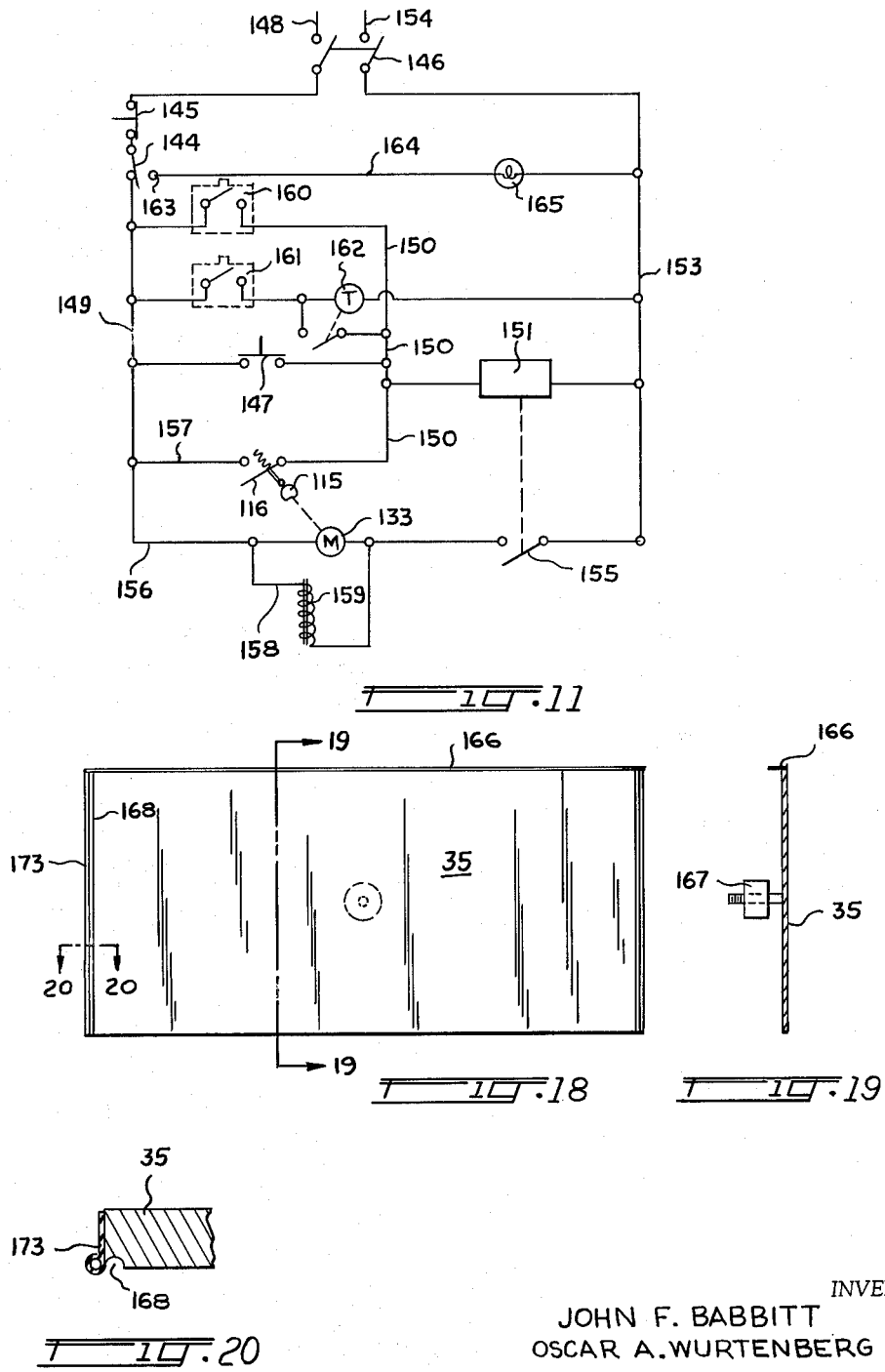

July 12, 1966   J. F. BABBITT ETAL   3,260,037
INDEFINITE LENGTH FILTER MEANS WITH PROGRAMMING MEANS
Filed Jan. 23, 1963   9 Sheets-Sheet 7
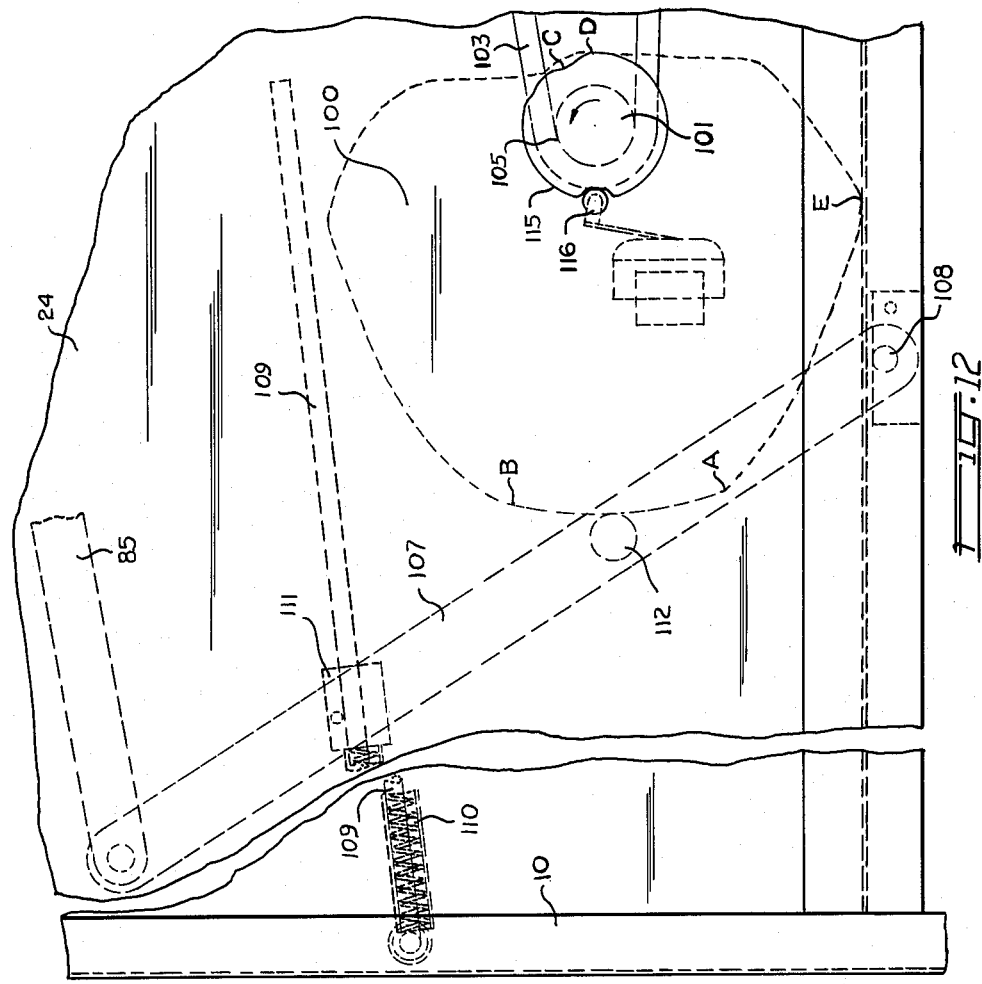
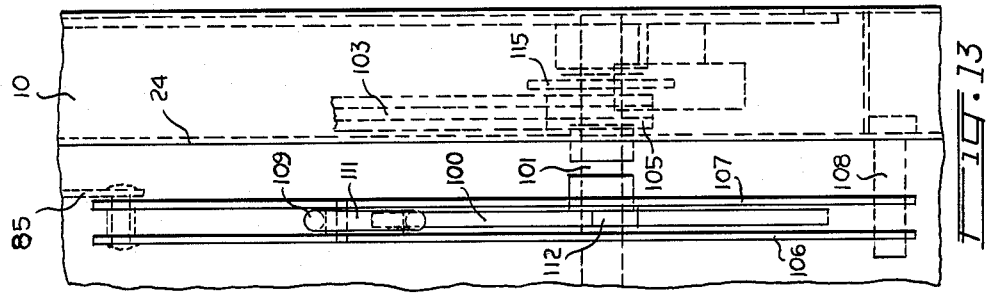
INVENTORS
JOHN F. BABBITT
OSCAR A. WURTENBERG
BY W. E. Sherwood
ATTORNEY

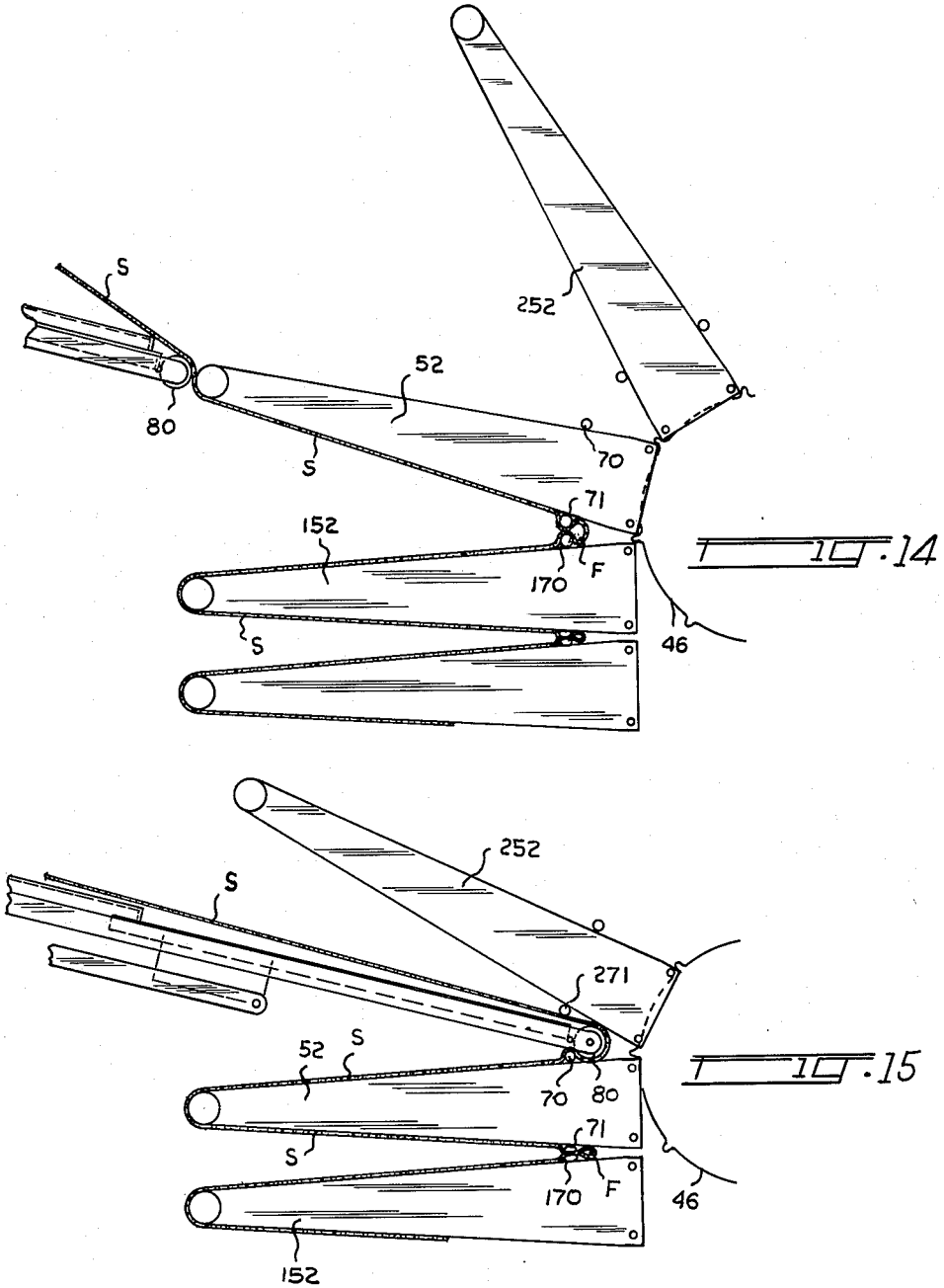

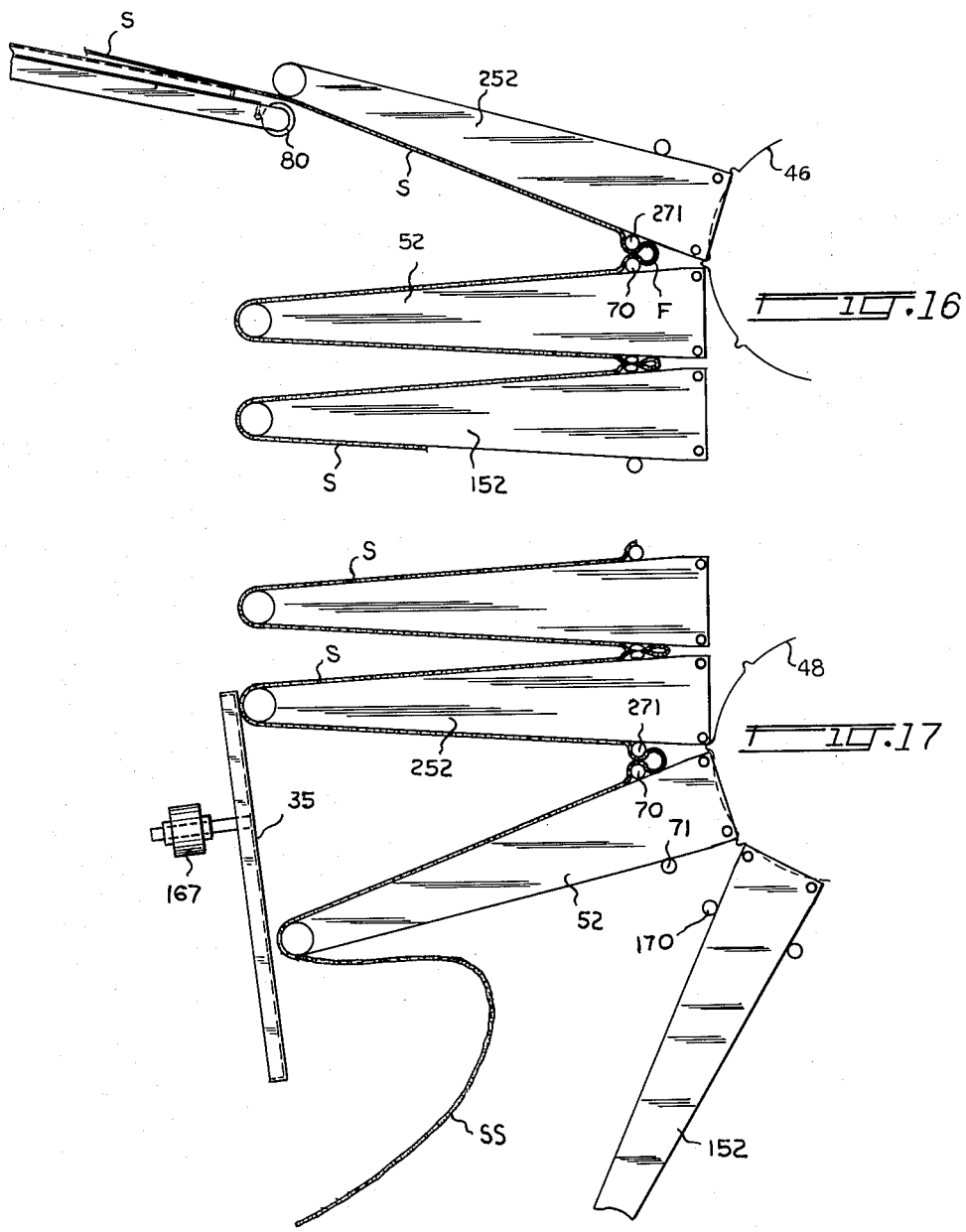

United States Patent Office 3,260,037
Patented July 12, 1966

3,260,037
INDEFINITE LENGTH FILTER MEANS WITH PROGRAMMING MEANS
John F. Babbitt and Oscar A. Wurtenberg, Louisville, Ky., assignors to Continental Air Filters, Inc., Louisville, Ky., a corporation of Delaware
Filed Jan. 23, 1963, Ser. No. 253,355
8 Claims. (Cl. 55—271)

This invention relates to filtering apparatus for gaseous fluids and more particularly to the type of filters in which a sheet of filtering medium is moved, while in corrugated or zig-zag configuration, across the face area of the duct confining that fluid.

The employment of such a sheet in zig-zag form within a duct in order to increase the ratio of filtering surface to duct face area is well known, as exemplified by the conventional filters in which the sheet is subdivided into replaceable units which are insertable in the duct in fresh condition and removed as a unit after completing their filtering action. A more difficult problem, however, is presented as regards sealing and attenuation of the sheet when the filter employs a moving sheet such as when the sheet is carried by a moving conveyor belt or the like arranged to move in a zig-zag path across the duct. It is to the solution of this latter problem that the present invention is directed.

One object of the invention is to provide an improved filter of the type indicated above and in which a sheet of filtering medium is moved across the duct without detrimental attenuation of the sheet and while presenting a large ratio of sheet filter surface to duct face area.

Another object is to provide a filter of the indicated type adapted for use with a wide variety of filtering media in sheet form and in which the sheet is securely held against a perforated or screen-like conveyor surface during the movement across the duct and without endangering the filtering integrity of that sheet.

Another object is to provide a filter having an improved means for depositing a filter sheet upon a moving conveyor and without detrimental stressing of that sheet.

Another object is to provide a filter having an improved means for shedding a spent filter sheet from a moving conveyor.

A further object is to provide an improved sealing between the upstream and downstream sides of a movable filter sheet during its filtering action, both when the sheet is at rest and when in movement.

A further object is to provide an improved means for preventing maladjustment of a filter sheet with respect to its supporting surface in the event of reverse pressure surges in a filter duct.

A further object is to provide an improved conveyor for supporting and moving a filter sheet.

A still further object is to provide an automatically operable filter apparatus having a large ratio of filtering medium surface to duct face area.

Other objects and advantages will become apparent as the description proceeds and when considered in conjunction with the accompanying drawings in which:

FIG. 3 is a side elevation view of the filter frame and filter parts, with portions broken away and with parts of the filter shown in dotted lines.

FIG. 4 is a plan view of a filter blade prior to attachment to the conveyor and with portions broken away.

FIG. 5 is a sectional view taken on line 5—5 of FIG. 4 and showing the blade attached to the conveyor chains.

FIG. 6 is a side elevation view of a blade and to a larger scale.

FIG. 7 is a detail of one corner of a blade showing the mounting of the sealing strips and to a still larger scale.

FIG. 8 is a plan view of one side portion of the reciprocable sheet-positioning means with portions of the overlying stationary shelf broken away.

FIG. 9 is a sectional view taken on line 9—9 of FIG. 8 and showing the mounting for the sheet-positioning means.

FIG. 10 is a sectional view taken on line 10—10 of FIG. 9 and to a larger scale.

FIG. 11 is an electrical wiring diagram for the operating controls of the filter.

FIG. 12 is a fragmentary side elevation view to a larger scale of one of the linkage-actuating cams with the cam shown in rest position.

FIG. 13 is an end elevation view showing the mounting of the linkage indicated by FIG. 12.

FIG. 14 is a schematic view indicating the relative positions of the sheet-positioning means and a conveyor blade at its sheet-receiving station with the parts at rest and with the blade partially clad with the filter medium.

FIG. 15 is a view similar to FIG. 14 with the sheet-positioning means at the extreme of its forward movement.

FIG. 16 is a view similar to FIG. 14 with the sheet-positioning means withdrawing from the position shown in FIG. 15 and approaching its rest position.

FIG. 17 is a schematic view of the clad blades leaving the filtering space and entering the sheet-shedding region of the filter.

FIG. 18 is a face view of the baffle as presented to the arcuate tip portions of the conveyor blades.

FIG. 19 is a sectional view taken on line 19—19 of FIG. 18, and

FIG. 20 is a sectional view to a larger scale taken on line 20—20 of FIG. 18.

Figure 1:
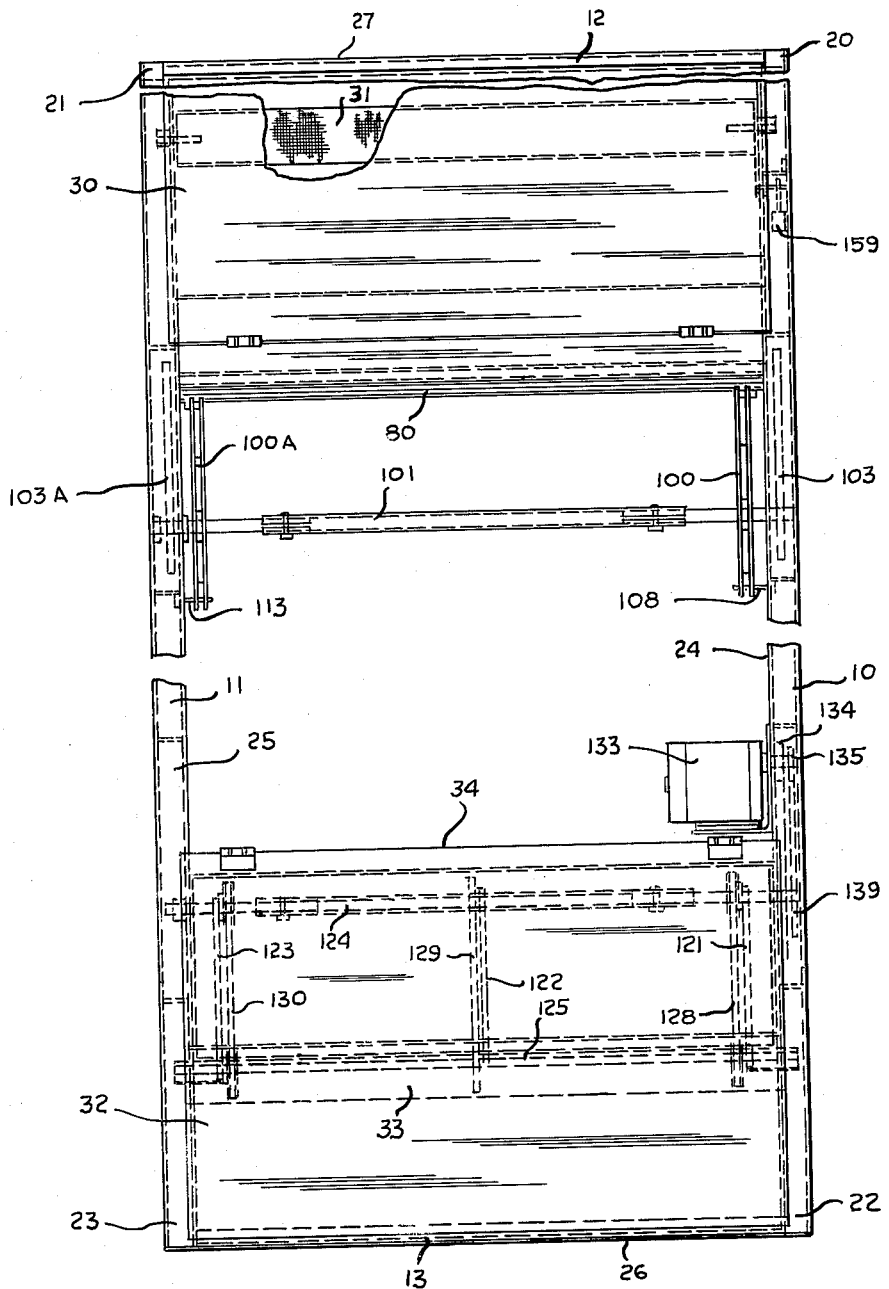
FIG. 1 is an end elevation view of the filter frame and filter parts as viewed downstream of the duct, with portions broken away and with the conveyor removed.
Figure 2:
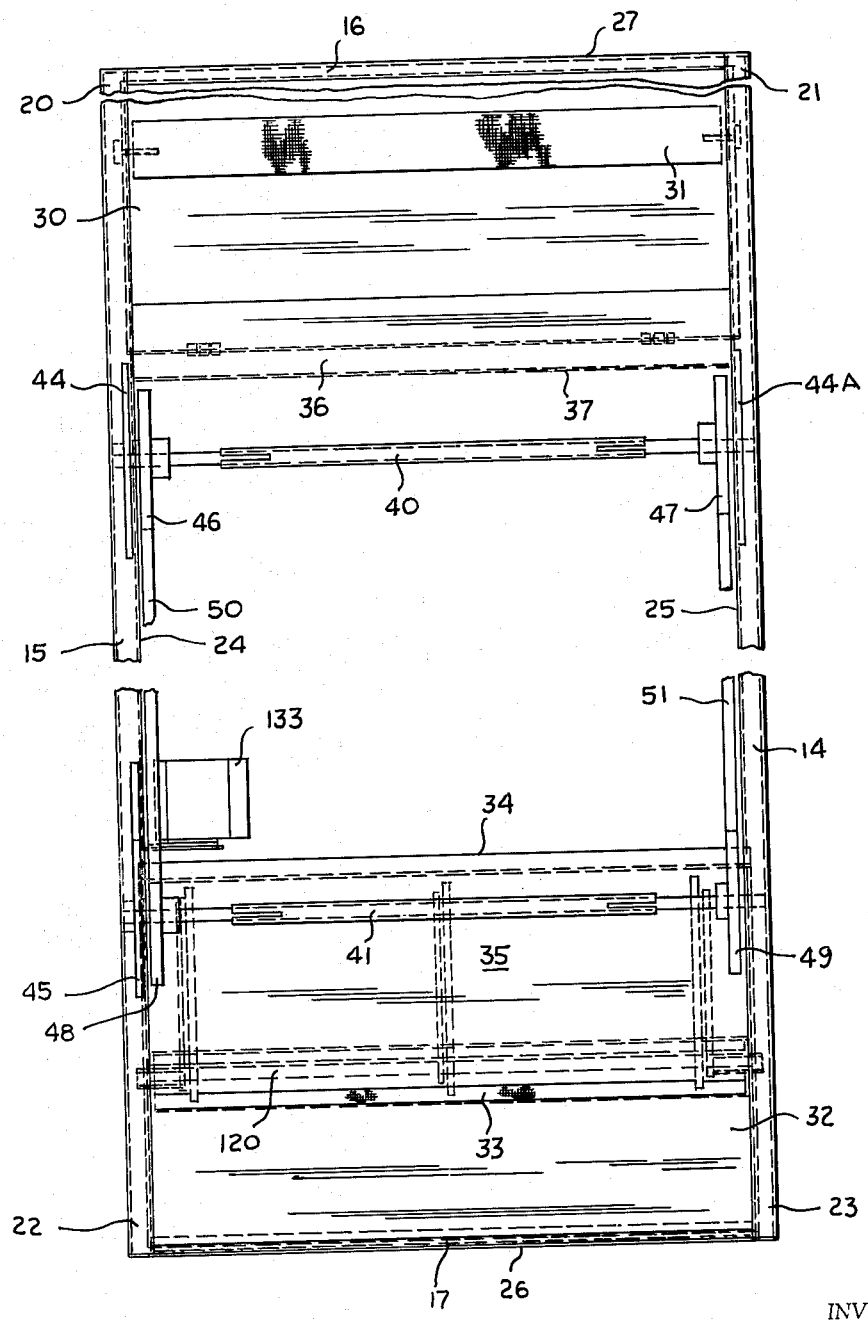
FIG. 2 is an end elevation view of the filter frame and filter parts as viewed upstream of the duct, with portions broken away and with the conveyor blades omitted.

Referring first to FIGS. 1, 2 and 3, a rigid framework for mounting the filter parts is provided for cooperation with a conventional duct, not shown, confining the flow of gaseous fluid to be treated. The frame comprises upstream end uprights 10 and 11 joined by upper and lower cross members 12 and 13. Similar downstream end uprights 14 and 15 are joined by cross members 16 and 17. Similar intermediate uprights are located at each side of the frame, as illustrated by the pair of such uprights 18 and 19 shown in FIG. 3, and all uprights along each side are joined by the respective upper and lower longitudinal frame members 20, 21 and 22, 23. For a purpose later to appear, the width of the uprights transversely of the frame is such as to provide a working space for various forms of driving means, thus to permit ready accessibility to those driving means, and at the same time avoiding projecting parts which would detract from the compact nature of the filter.

Inner side walls 24 and 25 are affixed to the inner surfaces of the uprights and a bottom portion 26 and a top portion 27 assist in forming the longitudinal tunnel-like confines of the frame for directed passage of the fluid therethrough. The downstream end of the frame is open for flow of filtered fluid into the delivery portion of the duct while the upstream end of the frame is partially closed by means of an upper movable door 30 giving access to the space enclosing the supply roll 31 of sheet filter medium. A similar lower door 32 at the upstream end of the frame gives access to the take-up roll 33 of spent medium.

Extending downstream from the upstream end of the frame is an imperforate generally horizontal floor shelf 34, having an imperforate depending baffle 35, later to be described, pivotally attached to the downstream end thereof. Also extending downstream from the upstream end of the frame is an inclined imperforate roof shelf 36 terminating at a lower end 37 (FIG. 2). The floor and roof thus described join the inner side walls which are rigidly mounted upon bracing extending between the frame uprights, it being understood that outer side walls also are mounted upon the same frame. Thus, as seen in FIG. 2, the gaseous fluid entering the filtering portion of the structure is confined to a duct portion bounded by inner side walls 24, 25; the upper edge of the floor shelf 34; and the lower edge 37 of the roof shelf, and this area is hereinafter defined as the effective face area of the duct.

Fluid passing this duct face area encounters a sheet of filter medium which is supported upon and moved by a conveyor located within the frame and mounted thereon, as best shown in FIG. 3. This conveyor, the blade portions of which form an important feature of the present invention, includes a pair of shafts 40 and 41 the ends of which are mounted upon plates at each side of the frame outboard of the inner side walls and affixed between adjacent uprights, one such pair of plates being seen at 42, 43. The shaft 40 carries a pair of sprockets 44 and 44A at its ends and the shaft 41 carries a sprocket 45 at one end, these sprockets lying outboard of the inner side walls. In addition, the respective shafts carry sprockets or the like 46, 47 and 48, 49 adjacent their ends and with these sprockets being mounted inboard of the inner side walls of the frame. Endless chains or the like 50 and 51 cooperate with these respective sprockets with the result that as shaft 41 is driven, the conveyor and all of its attached blades, one of which is diagrammatically shown at 52 in FIG. 3 likewise is moved. The trajectory of the ends of the several blades is conveniently indicated by the dotted path 53 which lies wholly within the confines of the described framework.

Referring now to FIGS. 4 to 7, a plurality of identical hollow blades are employed for the filter, each blade having generally triangular side walls 58 and 59 formed of sheet metal and with the peripheral edge thereof bent inboard at right angles to form mounting shoulders 60 and 61. As best seen in FIGS. 6 and 7, these shoulders are terminated adjacent the rearmost ends of the blade side walls thus to provide unimpeded base portions of the blades with apertures 62 and 63 therein, which in conjunction with suitable pins extending through the appropriate chain links serve to mount the blade upon these chains. Joining the two blade side walls adjacent the distal ends of the same is a hollow tube 64 and joining those walls adjacent the base ends is a first pair of rigid thin strips 65 and 66. Attached to the outside faces of this first pair of strips and to the inner faces of each of the shoulders 60 and 61 and tightly stretched over the tube 64, is a screen-like blade surface member 67 which conveniently may be a flattened expanded steel sheet having smooth surfaces which will not snag the filter medium sheet. Other equivalent blade surface materials having the ability to provide a firm and large area of support to the filter medium and a relatively small barrier to the passage of gaseous fluid through the blade may, of course, be employed without departing from the invention.

Extending transversely of the blade adjacent its base portion are upper and lower seals 70 and 71, respectively, each of which comprises a tubular portion which is readily deformable and having a tangentially extending flat tab portion. For example, a seal made of a soft vinyl material with a durometer reading of about fifty, is satisfactory. The tab portions of these seals rest upon the first pair of strips 65 and 66 and are clamped in position by means of a second pair of cooperating thin strips 72 and 73. In addition, similar side seals 74 and 75 are mounted upon the peripheries of each of the blade side walls and project outboard thereof as best seen in FIG. 7. These latter seals rub against the inner walls 24 and 25 of the frame as the blade is moved, and due to the difference in elevation of the tubular part of these seals and of the blade surface member 67 as they pass around the reinforcing tube 64, a shallow channel is formed which assists in positioning and confining the sheet of filter medium as it is placed upon and shed from the moving blade. Various means may be employed to attach the side seals to the shoulders of the blade side walls, a series of spaced staples 76 extending through the tab portions of these seals and clinched beneath the shoulders 60 and 61 being shown herein. As indicated by FIG. 7, the rearward ends of the side seals 74 and 75 abut against the respective ends of the transverse seals 70 and 71. Accordingly, a relatively light weight hollow blade having a gradually increasing cross section in the direction of flow of the filtered gaseous medium, and having its own sealing means carried thereby, and having a smooth arcuate forward tip, the significance of which will later appear, thus is provided for use in the general combination of structural parts.

As an important feature of the invention, many varieties of filter medium including fragile sheets of paper, glass, wool, and the like may be employed in our filtering apparatus and the above-described blade, against which such a sheet of filter medium is supported during its filtering operation, serves to relieve that sheet of any significant attenuation and detrimental stressing. However, in order to bring the sheet from the supply roll to the blades which are to support the same, means for handling the sheet without exerting damaging tension stresses thereon must also be provided and one satisfactory form of such means may now be noted by reference to FIGS. 8 to 10.

This reciprocable sheet-positioning means preferably comprises a freely rotatable tube 80 extending transversely of the duct and journalled in ball bearings or the like at each end, these bearings being mounted in suitable spacers, one such bearing 81 and spacer 82 being seen in FIG. 8. Spacer 82 in turn is rigidly affixed to the side of an elongated, vertically arranged plate 83 at the extreme forward end thereof and this plate at its rearward portion is fastened to a parallel plate 84. Pivotally mounted upon the thus-described plates is a linkage arm 85A actuated in a manner later to be described and operated simultaneously with a companion linkage arm 85 (FIG. 3) which is pivotally attached to the plates at the opposite side of the sheet-positioning means. Rigidly fastened to the surface of plate 83 facing wall 25 is an elongated slide 86 adapted for movement in a channel member 87 affixed to that inner wall and serving to guide the movement of the entire sheet-positioning means. This channel member is inclined downwardly of the filter frame along an axis parallel to the longitudinal axis of the conveyor blade 52 when at rest as shown in FIG. 3.

It will, moreover, be understood that a similar slide and channel member are provided at the other side of the sheet positioning means. Affixed to the top and sides of the described plates is an imperforate flat shutter 90 along the side edges of which are seals carried by the shutter and adapted to rub against the adjacent side walls of the duct, one such seal 91 being shown in FIG. 10. This shutter moves in a plane lying underneath the inclined stationary shelf 36 and affixed to the underside of the forward end of that shelf is another seal 92 extending transversely across the duct between side walls 24 and 25 and bearing at all times against the top surface of the shutter as indicated in FIG. 9. In addition, the forward end of the shutter is bent downwardly at wall portion 93 and then bent rearwardly along wall portion 94 to provide a substantial mounting seat for a sealing strip 95 of resilient material, such as felt or the like, and which has a freely flexible portion lying at all times in contact with the periphery of roller tube 80. Suitable brackets, one of which is shown at 96, and of which the spacers 82 form an integral portion, serve to position the roller tube 80 in predetermined position with respect to the sealing strip 95 and the forward end of the described shutter 90.

Referring now to FIGS. 1 and 12, the timed movement of the sheet-positioning means is effected by a pair of similar cams 100 and 100A which are fixed upon a rotatable shaft 101 journalled at its ends in side plates; one such side plate being shown at 102 (FIG. 3), affixed to the bracing between uprights at the sides of the filter frame. This shaft is turned by means of chains 103 and 103A extending from the sprockets 44 and 44A on the conveyor shaft 40 and engaging in similar, but smaller diameter, sprockets on the shaft 101, one such sprocket being shown at 105. For cooperation with cam 100 and linkage arm 85 there is provided a second linkage member comprising a pair of spaced apart flat arms 106, 107 (FIG. 13) pivoted at their lower ends upon a pin 108 extending inwardly from the frame and pivotally secured at their upper ends to the arm 85. Also pivotally secured upon the frame and extending in a downstream direction between the flat arms is an elongated guide 109 having a compression spring 110 which bears at its forward end against a swinging abutment 111 carried by those arms. A freely rotatable cam follower 112 likewise is mounted between the arms and bears at all times against the confronting cam lobe portion of the cam 100. It will be understood that a similar cam and linkage arrangement is provided at the opposite side of the frame, the lower linkage member of which is pivotally attached at its lower end to pin 113 (FIG. 1), and pivotally attached at its upper end to arm 85A (FIG. 9). In addition, at one end only of shaft 101 and carried thereby outboard of the cam 100 is a switch-actuating cam 115 cooperating with a cam-follower 116, biased toward switch opening position, the operation of which is later to be described.

With the foregoing description in mind and referring now to the cam 100 of FIG. 12 and to the schematic view of FIG. 14, the cam follower 112 is resting upon a cam lobe of equal radius extending from point A to point B of that cam and forming a first dwell phase through which the cam turns without modifying the retracted position of the sheet-positioning means. Also as seen in FIG. 14 the sprocket 46 is at rest with blade 52 separated from its adjacent leading blade 152 by a smaller angular separation than it is from its adjacent following blade 252 due to the relative locations on the sprocket of the chain portions to which those blades are attached. Moreover, at this time the entire screen-like member of blade 152 is covered with the sheets of filter material; the under surface of the similar screen-like member of blade 52 is covered with that sheet which extends therefrom over roller 80 and to the supply roll; and the upper surface of blade 52 and all of the screen-like members of the following blade 252 has no sheet material thereon. At this same time the seal 71 of blade 52 is in contact with the companion seal 170 of blade 152 and a small transverse fold F of sheet S lying between those seals and the bases of those blades is disposed in non-filtering relation to the incoming fluid, the pressure of which fluid is serving to hold the other portions of the sheet firmly against the screen-like members of those blades.

When, therefore, the sprocket 46 begins to rotate by means of the driving arrangement later to be described, it is necessary that movement of blade 52 occur before movement of the sheet-positioning means with its roller 80. Accordingly, as soon as cam 100 has turned to bring point A beyond cam follower 112 the spring 110 acts to move the entire sheet-positioning means forward and this action will continue until the point C on the cam comes into contact with that cam follower at which time the roller 80 occupies the position shown in FIG. 15. The curved surface of roller 80 located upon the upstream side of the sheet cooperates with the arcuate surface of the tip of the blade located on the downstream side of the sheet to guide the sheet gently into its proper position when the sheet-positioning means begins its forward movement. As will be understood, during this movement blade 52 has been slowly advancing and thus the forward movement of the sheet-positioning means has gently pulled the sheet S from its supply roll and has laid the sheet, assisted by pressure of the incoming fluid, upon the upper surface of blade 52. Cam 100 includes a cam lobe portion of equal radius extending from point C to point D and forming a second dwell phase so that when the roller 80 reaches the position seen in FIG. 15 it rests there for a brief period while sprocket 46 is continuing to advance blade 52 and the following blade 252. This second dwell phase is a shorter duration than the first dwell phase and lasts until the seal 271 is in position to contact seal 70 upon retraction of the roller 80, thus to form the fold in the sheet as described above.

As a significant feature of the invention, the arrangement of the transverse seals on these blades is such that a tight grip or pinching action is effected upon the sheet by the seals as the sheet is carried across the effective face area of the duct, but without attenuating the sheet or damaging the same for the purpose of its rewinding as later to be described. This tight grip guards against dislodgment of the sheet in the event of pressure surges from the downstream side of the filter and also provides a control factor during the shedding of the sheet from the successive blades.

Passing now to FIG. 16, as the cam 100 turns to bring its point E into contact with the cam follower, the sheet-positioning means approaches the region adjacent the arcuate nose portion of advancing blade 252 meanwhile having assisted the pressure of the incoming fluid in guiding the sheet into proper position on the underside of that blade 252 during the retracting movement of the sheet-positioning means from the position seen in FIG. 15. During this movement substantially no tension stress has been imposed on sheet S. Moreover, even during the advancing movement of roller 80, as above described, only small tension stress is imposed due to the free rotation of the roller 80 and of the supply roll 31, and to the sharing of the stress along the entire width of the sheet, all of which serves to avoid detrimental attenuation of the sheet even when it is formed of fragile material. Thereafter, as cam 100 continues to turn bringing its point A into contact with the cam follower, the sheet-positioning means reaches its fully retracted position and comes to rest with roller 80 out of the path of the blades. Cam 100 continues to move, however, into the central portion of its first dwell region as shown by FIG. 12, thus permitting the last described blade 252 to reach the position shown by blade 52 in FIG. 14, whereupon, cam 115 now actuates switch 116 completing the cycle of sheet-loading and bringing the apparatus to rest unless there is a continuing demand for more sheet-loading, as later to be explained.

As will be apparent, during the above-described loading operation a simultaneous sheet-shedding operation has been occurring from other blades of the conveyor. Referring to FIG. 17 in which this latter operation is depicted, as soon as blade 252 reaches a position at which its forward arcuate nose comes into contact with the surface of the baffle 35, its immediate preceding blade 52 is beginning its travel around sprocket 48 and the next preceding blade 152 is already well advanced in its travel around that sprocket. At this time the seals 271 and 70 begin to relax their grip upon the fold of sheet which previously had been tightly held therebetween and the space between the lower side of blade 252 and the upper side of blade 52 now comes into communication with the downstream space of the filter and which contains the filtered fluid normally at a slightly lower pressure than the fluid upstream of the filter sheet. Meanwhile, seals 71 and 170 have completely separated from each other and the portion of the spent sheet SS formerly gripped therebetween now freely sags within the space beneath the floor shelf 34 in readiness for rewinding upon roll 33 (FIG. 3). This roll includes a central shaft 120 mounted at its ends for free rotation in bearings located at the sides of the frame. A suitable rewinding means is provided for taking up the spent sheet on this roll and may comprise a framework having arms 121, 122, 123 (FIG. 1) freely pivoted upon a transverse shaft 124 and carrying a transverse shaft 125 rotatably journalled in those arms at their lower ends. Attached to these shafts are corresponding pairs of pulleys, one pair of which is indicated at 126, 127, having belts or the like 128, 129 and 130 passing thereover. These belts lie in contact with the periphery of take-up roll 120 and as shaft 124 is driven, the belts serve to draw the spent sheet SS upon that roll in convolutely wound form, the weight of the pivoted framework aiding in forming a neat roll of the filter medium. Moreover, as the size of the spent roll is built up the framework pivots about shaft 124 to accommodate the increased roll diameter.

As best shown in FIG. 3, the movable elements of the filter thus far described are driven by an electrical motor 133 mounted upon a shelf projecting into the upstream space of the filter and having two sprockets 134 and 135 located on the motor shaft and disposed in the confines of the frame uprights outboard of the inner side wall 24. The sprocket 134 is connected by chain 136 with a sprocket 137 at one end of the shaft 41 of the conveyor and the sprocket 135 is connected by chain 138 with a sprocket 139 at one end of the shaft 124. Accordingly, the operation of the entire filter may be controlled merely by making or interrupting the circuits to this single motor and as seen in FIG. 11 numerous operating contingencies may be handled with a simple circuitry now to be described.

Assuming the filter to be loaded with a sheet of filter medium and with its conventional medium run-out switch 144 closed, its emergency manual switch 145 closed, and its double-pole line switch 146 closed; closing of the normally open starting switch 147 then establishes a circuit from line conductor 148 through switches 145, 144, conductor 149, closed switch 147, conductor 150, relay 151, conductor 153, and thence, to return line conductor 154. Closing of the relay causes relay arm 155 to close thus establishing a circuit from conductor 159 through conductor 156, motor 133, closed relay arm 155 and to conductor 153. Immediately upon starting of motor 133 the conveyor begins to move causing shaft 101 to turn and causing cam 115 to close switch 116 thus locking in the relay through a shunt circuit from conductor 149, conductor 157, closed switch 116, conductor 150, relay 151, and conductor 153. The starting switch 147 meanwhile has returned to opened position and the filter will now operate through one cycle involving the complete reciprocation of the sheet-positioning means; the positioning of the sheet upon the top surface of one blade and upon the lower surface of another blade and the shedding of spent sheet from the corresponding surfaces of two other blades which already have passed the duct face area.

As a circuit is established through motor 133, a shunt circuit simultaneously is made from conductor 156, conductor 158, solenoid coil 159 and thence to closed relay arm 155. Energization of coil 159 trips a conventional braking mechanism 160 associated with the rotatable supply roll 31 (FIG. 3) and permits that roll to turn freely and to dispense fresh sheet material to the sheet-positioning means. Upon de-energizing of coil 159, the brake immediately prevents further rotation of supply roll 31.

A conventional overload differential pressure switch 160 also is employed between conductors 149 and 150 and serves to start the motor automatically when pressure conditions in the duct so dictate. Likewise, a conventional medium-saver pressure switch 161 in conjunction with a timer 162 serves to sense the need for starting of the motor at prescribed time intervals and to establish a starting circuit when the pressure conditions so warrant at those time intervals. Moreover, when the supply roll 31 approaches exhaustion, the run-out switch 144 opens and establishes a warning circuit from contact 163, conductor 164, light or alarm means 165, and to conductor 153.

Pressure controls of the described types are particularly well adapted to the filter in view of the effective sealing provided between the upstream and downstream surfaces of the sheet. In addition to the several seals already described, a further sealing will be noted with respect to FIGS. 18 to 20 showing one form of baffle 35. This baffle is shown as being of planar construction, but may have a concave face, if desired, without departing from the invention. At its upper edge the baffle, which extends completely between side walls 24 and 25 of the duct, is provided with a conventional leak-proof hinge 166 which pivotally mounts the baffle upon the extreme forward edge of floor shelf 34. Mounted upon the back surface of the baffle at an appropriate location is an adjustable counter-weight 167 adapted to position the baffle yieldingly in the path of travel of the forward ends of the successive conveyor blades and to permit selective adjustment of the pressure exerted by the baffle upon the sheet medium carried by those blades as they move to the position indicated by FIG. 17. Along the forward side edges of the baffle, recesses 168 and 169 are formed therein to receive the projecting portions of seals 74 and 75 of the blades (FIG. 4). Moreover, along the same side edges additional seals 173 and 174 are mounted upon the baffle for rubbing movement along the side walls 24 and 25 of the duct as the baffle swings about its hinge 166.

Having thus described the invention, it will now be apparent that a high ratio of filtering sheet surface to effective duct face area may be employed, and in general such a ratio of about eight to one and not less than three to one is deemed characteristic of the present invention. The sheet medium employed may be of a fragile character when filtering conditions require the same since the construction of the filter parts adapt it for handling such fragile sheets. Furthermore, these advantages are secured without endangering the filtering integrity of the sheet due to the improved sealing between the upstream and downstream sides of that sheet.

Although the invention has been described with reference to preferred embodiments of the same, it will be apparent that various substitutions and changes in the described parts thereof may be made without departing from the invention. It is the intention, therefore, to limit the scope of the invention only to the extent indicated by the appended claims.

What is claimed is:

1. A gaseous fluid filter comprising in combination, a sheet of filter medium, a duct for confining the flow of fluid and having a space upstream of said sheet and a space downstream of said sheet, conveyor means for moving said sheet across the effective face area of said duct and comprising a movable gas-pervious structure in contact with the downstream face of said sheet as it passes said effective face area and leaving the upstream face of said sheet substantially unobstructed and substantially free of sheet-attenuating stress, said conveyor means having movable hollow blades each of which includes generally triangular side walls and a rear end of the blade, a blade reinforcing member joining the distal ends of said side walls and presenting a forwardly facing arcuate surface, a screen-like sheet-supporting surface joining the side walls of the blade, means attaching the blade adjacent its rear end to said conveyor, a seal separate from said sheet and carried by the blade at the periphery of each of the side walls thereof and extending outboard thereof, each of the seals projecting forwardly beyond said arcuate surface to form a shallow channel for receiving said sheet of filter medium upon the blade, and means for moving said conveyor.

2. A gaseous fluid filter comprising a duct for confining the flow of fluid and having an upstream space and a downstream space separated by a sheet of filtering medium, a supply roll from which said sheet is unwoun' to form a fresh portion of the sheet, a take-up roll upon which said sheet is rewound in the form of a spent portion of the sheet, a movable conveyor for transporting said sheet across said duct and including a plurality of hollow blades having distal ends projecting from said conveyor; said blades having screen-like surfaces upon which said sheet is supported during its movement toward a sheet-shedding region, means for moving said conveyor, and movable baffle means mounted within said duct adjacent said take-up roll and interposed between said upstream and downstream spaces, said baffle means being biased for yieldable positioning in the path of the distal ends of said blades whereby the portions of said sheet lying on said distal ends of said blades contact said baffle means and serve as a seal during the blade movement into said sheet-shedding region.

3. Apparatus as defined in claim 2 wherein said baffle includes a surface area sufficient to provide contact with the sheet on a following blade prior to the advancement of the next adjacent leading blade to its sheet-shedding region.

4. In a gaseous fluid filter arranged in a duct for confining the flow of fluid and having an upstream space and a downstream space separated by a sheet of filter medium, said filter including a supply roll from which said sheet is unwound to form a fresh portion of the sheet and a take-up roll upon which said sheet is rewound in the form of a spent portion of the sheet, a movable conveyor for transporting said sheet across said duct and having a plurality of hollow blades presenting screen-like surfaces upon which said sheet is supported, reciprocable means mounted in said upstream space and extending transversely of said duct for positioning said sheet in contact with said blades, means for actuating said reciprocable means during a portion of the movement of said conveyor, and a motor for driving said conveyor; the combination comprising an electrical system having a circuit including said motor; a relay circuit for starting and stopping said motor, a cam-actuated switch in said relay circuit, said switch being adapted to interrupt said relay circuit at the conclusion of each cycle of movement of said reciprocable means, and means for establishing said relay circuit in order to initiate operation of said motor.

5. A gaseous fluid filter comprising, a duct for confining the flow of fluid and having an upstream space and a downstream space separated by a sheet of filter medium, a supply roll from which said sheet is unwound to form a fresh portion of the sheet and a take-up roll upon which said sheet is rewound in the form of a spent portion of the sheet, a movable conveyor for transporting said sheet across said duct and including a plurality of hollow blades having screen-like surfaces upon which said sheet is supported, means for moving said conveyor, reciprocable means mounted in said upstream space and extending transversely of said duct for positioning said sheet upon said blade surfaces, said reciprocable means being movable between a first position outside the path of movement of said blades and a second position within the path of movement of said blades, an imperforate shutter carried by said reciprocable means and forming a barrier between said upstream and downstream spaces in the region of said supply roll during movement of said reciprocable means, and means for moving said reciprocable means.

6. A gaseous fluid filter comprising a duct for confining the flow of fluid and having an upstream space and a downstream space separated by a sheet of filter medium, a supply roll from which said sheet is unwound to form a fresh portion of the sheet, a take-up roll upon which said sheet is rewound in the form of a spent portion of the sheet, a movable conveyor for transporting said sheet across said duct and including a plurality of hollow blades having screen-like surfaces upon which said sheet is supported, means for moving said conveyor, and means upon said blades for pinching said sheet against adjacent blades during movement of said blades across said duct, said pinching means comprising resilient seals extending completely across and transversely of said blades and serving jointly as a pinching and a sealing means.

7. In a gaseous fluid filter arranged in a duct for confining the flow of fluid and having an upstream space and a downstream space separated by a sheet of filter medium, said filter including a supply roll from which said sheet is unwound to form a fresh portion of the sheet and a take-up roll upon which said sheet is rewound in the form of a spent portion of the sheet, a movable conveyor for transporting said sheet across said duct and having a plurality of hollow blades presenting screen-like surfaces upon which said sheet is supported, and reciprocable means mounted in said upstream space and extending transversely of said duct for positioning said sheet in contact with said blades; the combination comprising a motor, means for driving said conveyor from said motor, and means for actuating said reciprocable means during a portion of the movement of said conveyor, said actuating means comprising a mechanical linkage, a cam for actuating said linkage, and means for rotating said cam during movement of said conveyor.

8. Apparatus as defined in claim 7 wherein said cam includes a dwell portion permitting limited movement of said conveyor without corresponding movement of said linkage.

References Cited by the Examiner

UNITED STATES PATENTS

| | | | |
|---|---|---|---|
| 833,686 | 10/1906 | Hart | 55—500 X |
| 1,097,649 | 5/1914 | Kunzi | 270—79 |
| 1,831,369 | 11/1931 | Schirp | 55—353 X |
| 1,982,639 | 12/1934 | Christofferson | 55—352 |
| 2,016,991 | 10/1935 | Dollinger | 55—354 |
| 2,201,628 | 5/1940 | McCormick et al. | 55—521 X |
| 2,218,453 | 10/1940 | Mickle | 55—352 X |
| 2,335,144 | 11/1943 | Dahlman | 55—354 |
| 2,463,723 | 3/1949 | Spraragen | 55—354 |
| 2,516,680 | 7/1950 | Culpepper | 55—351 X |
| 2,848,064 | 8/1958 | Gregory et al. | 55—271 |
| 2,857,017 | 10/1958 | Nutting | 55—500 |
| 2,867,324 | 1/1959 | Hirs | 210—387 X |
| 3,055,277 | 9/1962 | Hagendoorn | 93—84 |

FOREIGN PATENTS

| | | |
|---|---|---|
| 552,894 | 2/1958 | Canada. |
| 793,163 | 11/1935 | France. |
| 845,862 | 5/1939 | France. |
| 635,076 | 4/1950 | Great Britain. |
| 743,876 | 1/1956 | Great Britain. |
| 823,648 | 11/1959 | Great Britain. |
| 560,698 | 4/1957 | Italy. |
| 104,202 | 4/1942 | Sweden. |

HARRY B. THORNTON, *Primary Examiner.*

D. E. TALBERT, JR., *Assistant Examiner.*